United States Patent
Alshinnawi et al.

(10) Patent No.: US 10,257,679 B2
(45) Date of Patent: Apr. 9, 2019

(54) RELATIVE LOCATION DETERMINATION FOR AUTO-CONFIGURATION OF COMPUTING SYSTEMS IN A NETWORK ENVIRONMENT

(71) Applicant: International Business Machines Corporation, Armonk, NY (US)

(72) Inventors: Shareef Alshinnawi, Apex, NC (US); Gary D. Cudak, Wake Forest, NC (US); Edward S. Suffern, Chapel Hill, NC (US); John Mark Weber, Wake Forest, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 760 days.

(21) Appl. No.: 14/506,668

(22) Filed: Oct. 5, 2014

(65) Prior Publication Data

US 2016/0099832 A1   Apr. 7, 2016

(51) Int. Cl.
*H04W 4/80* (2018.01)
*H04L 12/24* (2006.01)

(52) U.S. Cl.
CPC .......... *H04W 4/80* (2018.02); *H04L 41/0886* (2013.01)

(58) Field of Classification Search
CPC .............................. H04L 41/082; H04W 4/008
See application file for complete search history.

(56) References Cited

U.S. PATENT DOCUMENTS

| 8,315,211 | B2 | 11/2012 | Frank |
| 8,499,067 | B2 | 7/2013 | Joukov |
| 2006/0167624 | A1 | 7/2006 | Whalley et al. |

(Continued)

FOREIGN PATENT DOCUMENTS

| WO | WO2013089794 | 6/2013 |
| WO | WO2013085532 | 7/2013 |

OTHER PUBLICATIONS http://www.navizon.com/product-navizon-indoor-triangulation-system, Mar. 26, 2014.

(Continued)

*Primary Examiner* — Uzma Alam
(74) *Attorney, Agent, or Firm* — Steven M. Greenberg, Esq.; Shutts & Bowen LLP

(57) ABSTRACT

Embodiments of the invention provide for a method, device and computer program product for auto-configuring computing devices disposed in a network environment based upon a relative location of each of the computing devices. The method includes broadcasting into an electromagnetic near field from at least two surface positions of a computing device an identification and position of a corresponding one of the surface positions. The method further includes receiving in a receiver disposed on at least one of the surface positions, an identification of another computing device, and a corresponding position from which the identification had been broadcast. The method yet further includes repeating the broadcasting and receiving in other computing devices and determining in each of the other computing devices a position relative to another of the devices. Finally, the method includes establishing a device configuration in each of the computing devices based upon a correspondingly determined relative position.

18 Claims, 2 Drawing Sheets

(56) References Cited

U.S. PATENT DOCUMENTS

| | | | |
|---|---|---|---|
| 2009/0072967 A1* | 3/2009 | Campbell | G01S 13/876 340/539.13 |
| 2010/0287178 A1 | 11/2010 | Lambert et al. | |
| 2012/0185579 A1 | 7/2012 | Watanabe | |
| 2013/0246600 A1* | 9/2013 | Ohnishi | H04L 41/50 709/223 |
| 2014/0297855 A1* | 10/2014 | Moore | G06Q 10/087 709/224 |

OTHER PUBLICATIONS http://sourceforge.net/apps/mediawiki/xcat/index.php?title=XCAT_Features, Mar. 26, 2014.
http://sourceforge.net/projects/xcat/, Mar. 26, 2014.

* cited by examiner

RELATIVE LOCATION DETERMINATION FOR AUTO-CONFIGURATION OF COMPUTING SYSTEMS IN A NETWORK ENVIRONMENT

BACKGROUND OF THE INVENTION

Field of the Invention

The present invention relates to computing device management and more particularly to automated computing device configuration in a network environment.

Description of the Related Art

Pre-requisite to the utilization of a computing device in a network environment is the configuration of the computing device. The configuration of the computing device can range from assigning core network communications parameters to the computing device such as a private Internet protocol (IP) address, to more complex parameters such as system names. Conventionally, the dynamic host configuration protocol (DHCP) automatically assigns IP addressing data to connecting devices in a network. However, in the case of DHCP, the assignment of IP addressing data occurs on a first come first served basis and in random form based upon a seed starting value. As such, with respect to the presence of a multiplicity of computing devices in a data center, the assigned IP address to a given computing device provides little information regarding the computing device itself.

Tools do exist that perform bulk configuration of computing devices in a computing cluster. For example, tools such as the "Extreme Cloud Administration Toolkit" also referred to as "xCAT" in addition to many other functions, facilitate the automated configuration of different computing devices in a cluster. Most typically, the cluster is physically arranged in the form of different racks of server blades with the racks being positioned relative to one another in one or more rows. As such, administering each server blade in the cluster can be a daunting task just in terms of locating a desired one of the server blades. Advanced solutions provide for the global positioning system (GPS) assisted location of a server blade of interest so as to provide a precise location in the data center of the blade server to a requesting individual. But even in the most technically sophisticated solution, the configuration data of the different server blades provides no clue as to the location of the server blades within the cluster.

BRIEF SUMMARY OF THE INVENTION

Embodiments of the present invention address deficiencies of the art in respect to automated computing device configuration in a network environment such as a data center, and provide a novel and non-obvious method, system and computer program product for auto-configuring computing devices disposed in a network environment based upon a relative location of each of the computing devices. In an embodiment of the invention, a method for auto-configuring computing devices disposed in a network environment based upon a relative location of each of the computing devices includes broadcasting into an electromagnetic near field from at least two surface positions of a computing device an identification of the computing device, and a position identification of a corresponding one of the surface positions. The method further includes receiving in a receiver disposed on at least one of the surface positions, an identification of another computing device, and a corresponding position from which the identification had been broadcast. The method yet further includes repeating the broadcasting and receiving in a multiplicity of other computing devices and determining in each of the computing devices a position relative to another of the computing devices. Finally, the method includes establishing a device configuration in each of the computing devices based upon a correspondingly determined relative position. In this regard, the device configurations may include a different Internet protocol (IP) address assigned to each of the computing devices in a sequence specified by a relative position of each of the computing devices.

In one aspect of the embodiment, the two surface positions are located at different corners of a face of the computing device. For example, the different corners may include a front top left corner, a front top right corner, a front, bottom left corner and a front bottom right corner. In another aspect of the embodiment, the broadcasting and receiving in the electromagnetic near field occurs by way of near field communications. In yet another aspect of the embodiment, the computing devices are arranged in a multiplicity of racks positioned side by side in a data center and a starting point for configuring the computing devices is determined by first detecting in one of the computing devices a position at an end rack at a corner, and subsequently selecting the one of the computing devices as the starting point from which all subsequent device configurations are based in respect to a position of the other computing devices relative to the starting point.

In another embodiment of the invention, a computing device is configured to automatically establish a configuration based upon a relative location of the computing device in a data center. The computing device includes a processor and memory and at least two near field transmitter-receivers coupled to the processor and memory and disposed at correspondingly different positions on the surface of the computing device, the transmitter-receivers cooperatively communicating data in respectively different electromagnetic near fields. Finally, the system includes an auto-configuration module executing in the memory by the processor.

The module includes program code enabled upon execution in the memory to broadcast into one of the electromagnetic near fields from at least one of the surface positions an identification of the computing device, and a position identification of a corresponding one of the surface positions, to receive in at least one of the transmitter-receivers from a corresponding electromagnetic near field, an identification of another computing device, and a corresponding position from which the identification had been broadcast, to determine a position relative of the computing device relative to another computing device transmitting the received identification and corresponding position, and to establish a device configuration in the computing device based upon the determined relative position.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
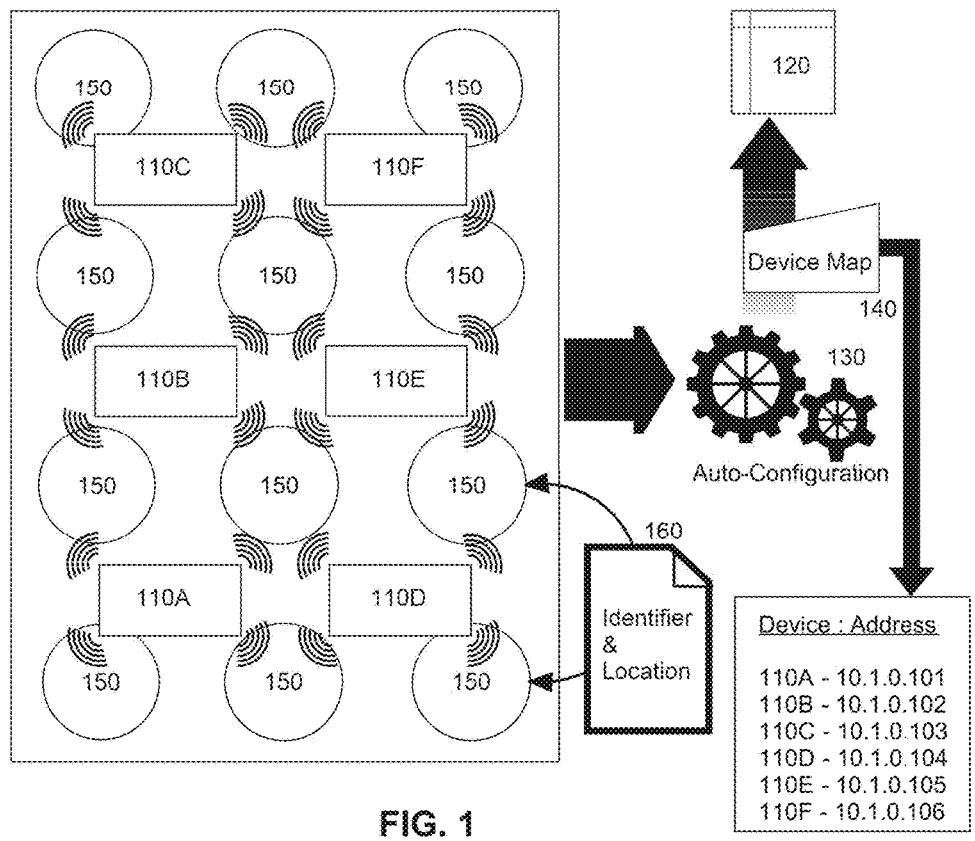
FIG. 1 is a pictorial illustration of a process for auto-configuring computing devices disposed in a network environment based upon a relative location of each of the computing devices.

Embodiments of the invention provide for auto-configuring computing devices disposed in a network environment based upon a relative location of each of the computing devices. In accordance with an embodiment of the invention, a set of computing devices can be arranged in a data center within one or more racks potentially organized by row in the case of multiple racks, and also potentially across multiple different rows in the case of a large number of racks. For each of the devices, at least two transmitter-receivers can be placed at different positions at or near a surface of the device, for example at each corner of a face of the computing device—top front left, top front right, bottom front left and bottom front right. As another option, additional transmitter-receivers can be placed at each corner of a rear of the computing device as well. Each of the transmitter-receivers can be configured to create an electromagnetic near field in which data can be exchanged with another proximately positioned transmitter-receiver.

For each of the computing devices, on command the transmitter-receivers can broadcast into a corresponding electromagnetic near field an identification of the computing device and a position on the computing device at which the transmitter-receiver can be found. Concurrently, each of the transmitter-receivers can listen for data broadcast into a corresponding electromagnetic near field so as to identify an adjacent computing device and a position thereon of a transmitter-receiver transmitting the data. As will be recognized by one of skill in the art, transmitter-receivers disposed at a position of a computing device for which no adjacent computing device exists will not receive any data and therefore, it will be determined that the computing device resides at a periphery of an arrangement of computing devices.

A starting position can be established for the multiplicity of computing devices in the data center. For example, the starting position can be a computing device positioned at a bottom portion of the left-most front-most rack of a multi-row arrangement of racks. Alternatively, the starting position simply can be a computing device positioned at the top portion of a single rack. Regardless of the particular architecture of racks and rows, once the starting point has been determined the computing device most loosely associated with the starting point can be identified based upon a pertinent one of the transmitter-receivers failing to detect data. By way of example, if the bottom-most, left-most computing device has been selected to be the starting point, then the bottom-most, left-most computing device can detect its position by failing to receive data at a transmitter-receiver positioned at the bottom front left corner of the computing device.

Once a particular one of the computing devices in the network environment such as a data center is determined to be the starting point device, the other computing devices in the data center can readily determine a relative position in the data center through peer-to-peer identification and naming. In this regard, the computing device a top the starting point device will readily recognize its position as a device positioned immediately above the starting point device, while a computing device next to the starting point device can be recognized as such. Subsequently, each of the computing devices can be configured based upon its position in the data center relative to the starting point device. For example, the IP address can be assigned to each computing device in accordance with its relative position such that the IP address of the computing device itself can indicate a location in the data center of a corresponding computing device.

In further illustration, FIG. 1 pictorially shows a process for auto-configuring computing devices disposed in a network environment based upon a relative location of each of the computing devices. As shown in FIG. 1, different computing devices 110, for example different blade servers, can be arranged in a network environment such as a data center. The arrangement of the computing devices 110A . . . 110F can include the placement of the computing devices 110A . . . 110F into one or more racks, with each rack organized in one or more rows of the racks. Each of the computing devices 110A . . . 110F can include two or more transmitter-receivers positioned on respective locations of a corresponding one of the computing devices. Each of the computing devices 110A . . . 110F further can be enabled to exchange data with other proximately positioned transmitter-receivers over an electromagnetic near field 150.

Auto-configuration logic 130 can direct each of the computing devices 110A . . . 110F to broadcast data 160 through each of the transmitter-receivers disposed thereon. The data 160 can include an associated identifier of the broadcasting one of the transmitter-receivers and a position of the broadcasting one of the transmitter-receivers on the broadcasting one of the computing devices 110A . . . 110F. The auto-configuration logic 130 yet further can direct each of the computing devices 110A . . . 110F to listen for broadcast data 160 from others of the computing devices 110 so as to identify all of the computing devices 110A . . . 110F that are adjacent to the listening one of the computing devices 110A . . . 110F.

In this way, each of the computing devices 110A . . . 110F can identify a relative position based upon the identity of adjacent ones of the computing devices 110A . . . 110F. In particular, ones of the computing devices 110A . . . 110F failing to detect an adjacent device can conclude a position at a perimeter of the arrangement of the computing devices 110A . . . 110F. Further, ones of the computing devices 110A . . . 110F failing to detect an adjacent device at both a side and top or bottom surface, can conclude a position at a corner of the arrangement of the computing devices 110A . . . 110F. Consequently, a device map 140 can be constructed indicating an arrangement of the computing devices 110A . . . 110F in the data center originating from a starting point, for instance computing device 110A positioned at a corner of the arrangement of the computing devices 110A . . . 110F.

The device map 140 in turn can be used to assign configuration data such as IP addresses to each of the computing devices 110A . . . 110F in a way that specifies a location of each of the computing devices 110A . . . 110F in the network environment. For instance, the computing device 110A can be assigned a first IP address in a sequence of IP addresses and subsequent IP addresses can be assigned to others of the computing devices 110B . . . 110F in an order dictated by the device map 140. As such, a review of an IP address for one of the computing devices 110A . . . 110F can indicate a location of the one of the computing devices 110A . . . 110F in the arrangement of computing devices 110A . . . 110F in the data center.

Figure 2:
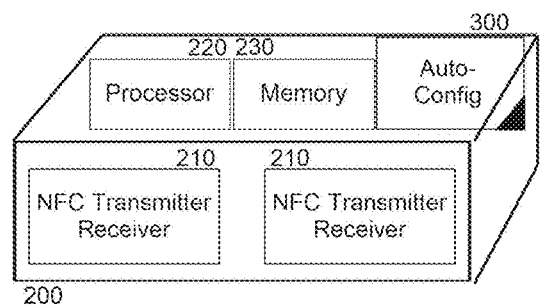
FIG. 2 is a schematic illustration of a computing device configured for auto-configuring computing devices disposed in a network environment based upon a relative location of each of the computing devices; and, FIG. 3 is a flow chart illustrating a process for auto-configuring computing devices disposed in a network environment based upon a relative location of each of the computing devices.

The process described in connection with the process shown in FIG. 1 can be implemented in connection with several different computing devices. In yet further illustration, FIG. 2 schematically illustrates a computing device configured for auto-configuring computing devices disposed in a network environment based upon a relative location of each of the computing devices. The computing device 200 can include different physical surfaces as shown in FIG. 2. Two or more near field communications (NFC) transmitter-receivers 210 can be disposed at different positions at or near the physical surface of the computing device 200. Each of the NFC transmitter-receivers 210 can be configured to establish an electromagnetic near field through which data can be broadcast by and received by the NFC transmitter receiver 210.

The computing device 200 also can include a processor 220 and memory 230. An auto-configuration module 300 can include program code enabled upon execution in the memory 230 by the processor to direct each NFC transmitter-receiver 210 to broadcast data including an associated identifier of the computing device 200 and a position of the NFC transmitter-receiver 210. The program code of the auto-configuration logic 130 yet further can be enabled to direct each NFC transmitter-receiver 210 to listen for broadcast data from other computing devices so as to identify all of the computing devices that are adjacent to the computing device 200. The program code of the auto-configuration logic 130 even yet further can be enabled to compute a relative position of the computing device 200 with respect to adjacent computing devices detected by the NFC transmitter-receivers 210. Finally, the program code of the auto-configuration module 300 can be enabled to assign configuration data to the computing device 200 based upon the computed relative position.

Figure 3:
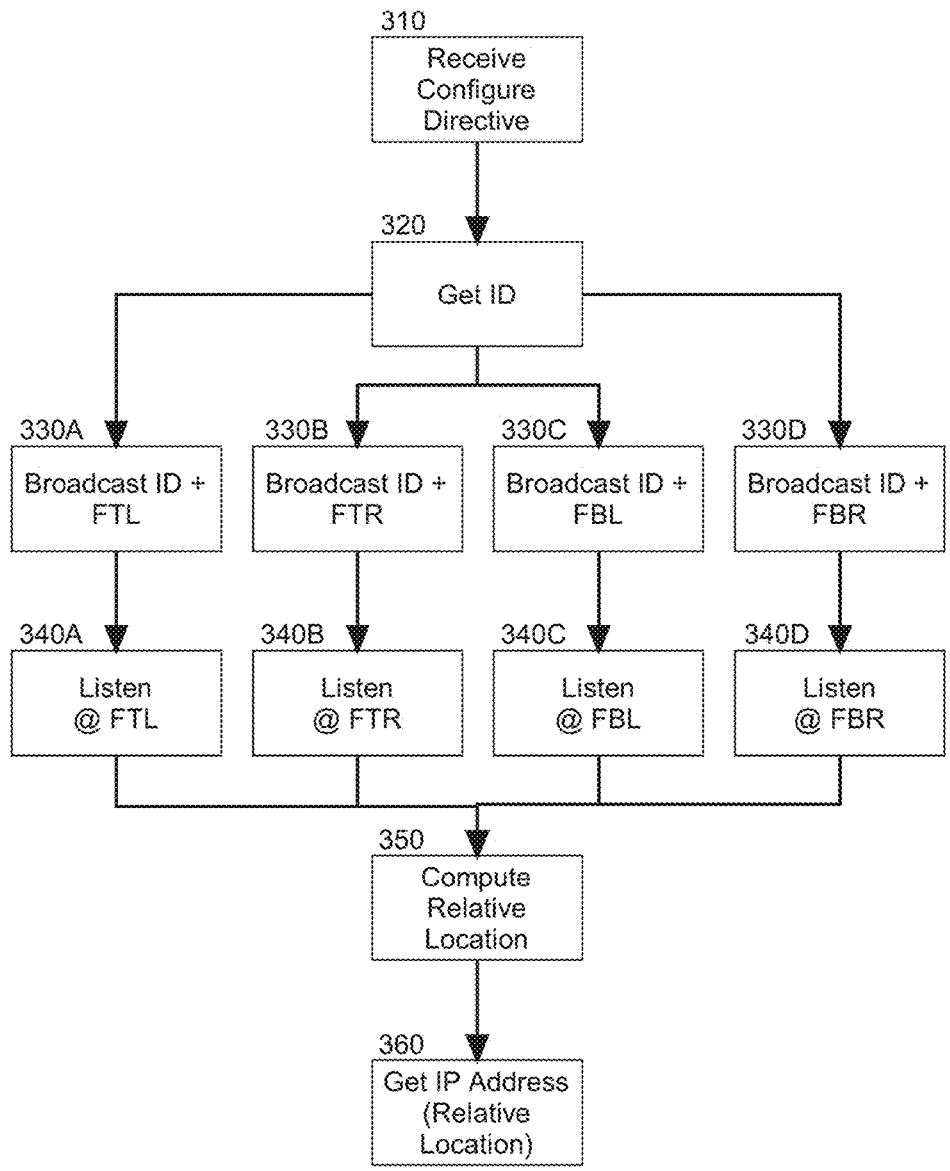

In even yet further illustration of the operation of the auto-configuration module 300, FIG. 3 is a flow chart illustrating a process for auto-configuring computing devices disposed in a network environment based upon a relative location of each of the computing devices. Beginning in block 310, a directive can be received in the computing device to initiate auto-configuration. In block 320, an identifier can be loaded into memory identifying the computing device. Thereafter, in blocks 330A, 330B, 330C, 330D, the identifier can be broadcast through each of two or more NFC transmitter-receivers along with a respective position, for instance front top left, front top right, front back left or front back right. Also, in blocks 340A, 340B, 340C, 340D, the NFC transmitter-receivers each can listen from broadcast data from adjacent computing devices. Subsequently, a relative location of the computing device can be determined based upon the data received at each NFC transmitter-receiver. Finally, in block 360 an IP address can be assigned to the computing device in accordance with the computed relative position.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for auto-configuring computing devices disposed in a network environment based upon a relative location of each of the computing devices, the method comprising:

broadcasting into an electromagnetic near field from at least two surface positions of a computing device an identification of the computing device, and a position identification of a corresponding one of the surface positions;

receiving in a receiver disposed on at least one of the surface positions, an identification of another computing device, and a corresponding position from which the identification had been broadcast;

repeating the broadcasting and receiving in a multiplicity of other computing devices;

determining in each of the computing devices a position relative to another of the computing devices; and, establishing a device configuration in each of the computing devices based upon a correspondingly determined relative position.

2. The method of claim 1, wherein the at least two surface positions are located at different corners of a face of the computing device.

3. The method of claim 2, wherein the different corners include a front top left corner, a front top right corner, a front, bottom left corner and a front bottom right corner.

4. The method of claim 1, wherein the broadcasting and receiving in the electromagnetic near field occurs by way of near field communications.

5. The method of claim 1, wherein the computing devices are arranged in a multiplicity of racks positioned side by side in a data center and a starting point for configuring the computing devices is determined by first detecting in one of the computing devices a position at an end rack at a corner, and subsequently selecting the one of the computing devices as the starting point from which all subsequent device configurations are based in respect to a position of the other computing devices relative to the starting point.

6. The method of claim 1, wherein the device configurations comprise a different Internet protocol (IP) address assigned to each of the computing devices in a sequence specified by a relative position of each of the computing devices.

7. A computing device configured to automatically establish a configuration based upon a relative location of the computing device in a network environment, the system comprising:
- a processor and memory;
- at least two near field transmitter-receivers disposed a correspondingly different positions on a surface of the computing device and coupled to the processor and memory, the transmitter-receivers cooperatively communicating data in respectively different electromagnetic near fields; and,
- an auto-configuration module executing in the memory by the processor, the module comprising program code enabled upon execution in the memory to broadcast into one of the electromagnetic near fields from at least one of the surface positions an identification of the computing device, and a position identification of a corresponding one of the surface positions, to receive in at least one of the transmitter-receivers from a corresponding electromagnetic near field, an identification of another computing device, and a corresponding position from which the identification had been broadcast, to determine a position relative of the computing device relative to another computing device transmitting the received identification and corresponding position, and to establish a device configuration in the computing device based upon the determined relative position.

8. The device of claim 7, wherein the different surface positions are located at different corners of a face of the computing device.

9. The device of claim 8, wherein the different corners include a front top left corner, a front top right corner, a front, bottom left corner and a front bottom right corner.

10. The device of claim 7, wherein the broadcasting and receiving occurs by way of near field communications.

11. The device of claim 7, wherein the program code of the module is further enabled to determine whether or not the computing device is to be used as a starting position for all other computing devices by failing to receive an identification and corresponding position at one of the transmitter-receivers.

12. The device of claim 7, wherein the device configuration comprises an Internet protocol (IP) address assigned according to a sequence of IP addresses of other computing devices in the data center specified by a relative position of each of the computing devices in the data center.

13. A computer program product for auto-configuring computing devices disposed in a network environment based upon a relative location of each of the computing devices, the computer program product comprising a computer readable storage medium having program instructions embodied therewith, the program instructions executable by a device to cause the device to perform a method comprising:
- broadcasting by the device into an electromagnetic near field from at least two surface positions of a computing device an identification of the computing device, and a position identification of a corresponding one of the surface positions;
- receiving by the device in a receiver disposed on at least one of the surface positions, an identification of another computing device, and a corresponding position from which the identification had been broadcast;
- repeating by the device the broadcasting and receiving in a multiplicity of other computing devices;
- determining by the device in each of the computing devices a position relative to another of the computing devices; and,
- establishing a device configuration in each of the computing devices based upon a correspondingly determined relative position.

14. The computer program product of claim 13, wherein the at least two surface positions are located at different corners of a face of the computing device.

15. The computer program product of claim 14, wherein the different corners include a front top left corner, a front top right corner, a front, bottom left corner and a front bottom right corner.

16. The computer program product of claim 13, wherein the broadcasting and receiving in the electromagnetic near field occurs by way of near field communications.

17. The computer program product of claim 13, wherein the computing devices are arranged in a multiplicity of racks positioned side by side in a data center and a starting point for configuring the computing devices is determined by first detecting in one of the computing devices a position at an end rack at a corner, and subsequently selecting the one of the computing devices as the starting point from which all subsequent device configurations are based in respect to a position of the other computing devices relative to the starting point.

18. The computer program product of claim 13, wherein the device configurations comprise a different Internet protocol (IP) address assigned to each of the computing devices in a sequence specified by a relative position of each of the computing devices.

* * * * *